(12) United States Patent
Szabo et al.

(10) Patent No.: US 9,560,191 B2
(45) Date of Patent: Jan. 31, 2017

(54) METHOD AND ARRANGEMENT FOR DETERMINING A CHARGING OF A BATTERY OF A USER DEVICE

(71) Applicant: Telefonaktiebolaget L M Ericsson (publ), Stockholm (SE)

(72) Inventors: Geza Szabo, Kecskemet (HU); Gergely Pongrácz, Budapest (HU); László Toka, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 9 days.

(21) Appl. No.: 14/539,420

(22) Filed: Nov. 12, 2014

(65) Prior Publication Data
US 2015/0133201 A1  May 14, 2015

(30) Foreign Application Priority Data
Nov. 13, 2013  (EP) .................................... 13192703

(51) Int. Cl.
*H04M 1/73* (2006.01)
*H04W 24/08* (2009.01)
*H04W 52/02* (2009.01)

(52) U.S. Cl.
CPC ............... *H04M 1/73* (2013.01); *H04W 24/08* (2013.01); *H04W 52/0258* (2013.01)

(58) Field of Classification Search
None
See application file for complete search history.

(56) References Cited

U.S. PATENT DOCUMENTS

| 2010/0052930 | A1 | 3/2010 | Grigsby et al. | |
| 2010/0317379 | A1 | 12/2010 | Gupta | |
| 2012/0281536 | A1* | 11/2012 | Gell | H04W 28/06 370/235 |
| 2012/0317269 | A1* | 12/2012 | Weppler | H04L 41/0654 709/224 |
| 2013/0069583 | A1* | 3/2013 | Lemelman | G06F 1/1635 320/107 |

(Continued)

OTHER PUBLICATIONS

Zhang, Lide et al., "Accurate Online Power Estimation and Automatic Battery Behavior Based Power Model Generation for Smartphones", CODES+ISSS'10, Scottsdale, Arizona, USA, Oct. 24-29, 2010, 1-10.

*Primary Examiner* — Alejandro Rivero
(74) *Attorney, Agent, or Firm* — Murphy, Bilak & Homiller, PLLC

(57) ABSTRACT

This disclosure relates to a method, and a network node for determining a charging of a battery of a user device. Network traffic of the user device is monitored, where the network traffic comprises network traffic of an application and/or a service of the user device. A network traffic pattern is identified for the monitored network traffic and a battery-charging event is detected based on the identified network traffic pattern. Charging of the battery is determined of the user device, based on the detected battery-charging event. These features and operations offer a number of advantages. For example, they allow a network operator to implement detection of battery-charging events using the operator's current network setup, because the teachings herein require no changes to existing network deployments, nor are additional protocols needed.

12 Claims, 2 Drawing Sheets

(56) References Cited

U.S. PATENT DOCUMENTS

2013/0173947 A1\* 7/2013 Nomura ............ G01R 31/3613
  713/340
2014/0045436 A1\* 2/2014 Gutierrez, Jr. .... H04M 1/72522
  455/67.11

\* cited by examiner

METHOD AND ARRANGEMENT FOR DETERMINING A CHARGING OF A BATTERY OF A USER DEVICE

RELATED APPLICATIONS

This application claims priority under 35 U.S.C. §119 from EP 13192703.0, filed on 13 Nov. 2013.

TECHNICAL FIELD

This disclosure relates to a method and a network node, for determining a charging of a battery of a user device.

BACKGROUND

Smartphones of today typically comprise a fast central processing unit (CPU), a large display and a fast access to a network such as Internet, and therefore often consume considerable amounts of energy.

Battery consumption can be reduced by focusing on user device-related network behavior optimization. This can only be achieved with some compromise on quality of experience e.g., the user has to switch to a lower performance channel or periodically switch off the radio unit to spare energy.

Moreover, optimization for the battery has paramount importance if the battery is close to getting depleted. For this reason it would be useful to have access to charging information of the UE and to take into account a battery status at optimization decisions.

From Zhang, et al., "Accurate online power estimation and automatic battery behavior based model generation for smartphones" in 2010 IEEE/ACM/IFIP International conference on Hardware/Software Co-design and System Synthesis, an automated power model construction technique using built-in battery voltage sensors and knowledge of battery discharge behavior to monitor power consumption, is known. This technique does not require external measurement equipment. A second component of this method applies the constructed power models for online power estimation. This method is totally terminal based, as it collects data locally, creates power models locally and utilizes them locally.

There is a need for information about charging of a user device without the need to install software components on the user devices.

SUMMARY

It is an object of example embodiments of the invention to address at least some of the issues outlined above.

According to a first aspect of the teachings herein, the above object is achieved by a method for determining a charging of a battery of a user device. The method comprises monitoring network traffic of the user device, wherein the network traffic comprises network traffic of an application and/or a service of the user device. The method also comprises identifying a network traffic pattern of the monitored network traffic. Also, the method comprises detecting a battery-charging event based on the identified network traffic pattern. In addition, the method comprises determining the charging of the battery of the user device, based on the detected battery-charging event.

According to a second aspect of the teachings herein, the above object is achieved by a network node for determining a charging of a battery of a user device. The network node comprises monitoring means that is adapted to monitor network traffic of the user device, wherein the network traffic comprises network traffic of an application and/or a service of the user device. The network node further comprises identifying means that is adapted to identify network traffic pattern of the monitored network traffic. The network node further comprises detecting means that is adapted to detect a battery-charging event based on the identified network traffic pattern. In addition, the network node comprises determining means that is adapted to determine the charging of the battery of the user device based on the detected battery-charging event.

This object and others are also achieved by the embodiments according to the appended dependent claims.

Embodiments of the present invention provide a number of advantages, of which one is the possibility for a network operator to implement detection of battery-charging events in a current network setup, as no changes in the current network deployment or additional protocols are needed.

The detected battery-charging events can be also used by the operators for several use cases e.g., offering battery replacement for a user device.

BRIEF DESCRIPTION OF THE DRAWINGS

Example embodiments will now be described in more detail, and with reference to the accompanying drawings, in which.

DETAILED DESCRIPTION

In the following description, different example embodiments of the invention will be described in more detail, with reference to accompanying drawings. For the purpose of explanation and not limitation, specific details are set forth, such as particular scenarios and techniques in order to provide a thorough understanding.

Embodiments of the present invention are executed at an operator side of a network, without the need to interfere with or negatively affect user devices.

As proposed herein, a method for determining a charging of a battery of a user device is based on detecting the occurrence of battery-charging events, e.g., detecting that the user device is plugged into a charger at, for instance, 10:30 PM and removed from the charger at 7:00 AM. Advantageously, such detections are based on non-intrusive network traffic monitoring. Information on the charging of a battery in a user device can be used in a variety of ways, as may be seen in the non-limiting use cases presented later in this disclosure.

Thus, according to the proposed method in one or more embodiments, the charging of a battery of a user device is determined based on monitoring network traffic. Such monitoring consists of non-intrusive monitoring of network traffic, from a user device perspective and, hence, there is no need to install or update a user device in order to determine the charging of a battery of said user device. Further, the disclosed method directly complements existing capabilities of mobile broadband operators to record network traffic for user devices.

It is herein proposed that by observing the network traffic of a user device it is possible to pinpoint the events of putting the user device on a charger and removing it from the charger. These events can be pinpointed, from identification of network traffic patterns.

It is observed that when a user device, such as a phone, is plugged onto a charger the screen of the user device always brightens up as if a button was touched or pressed by a user. Further in conjunction with connecting the user device to a battery charger, the network traffic of the user device may indicate that the user device is set to update the content of the user device.

Figure 1:
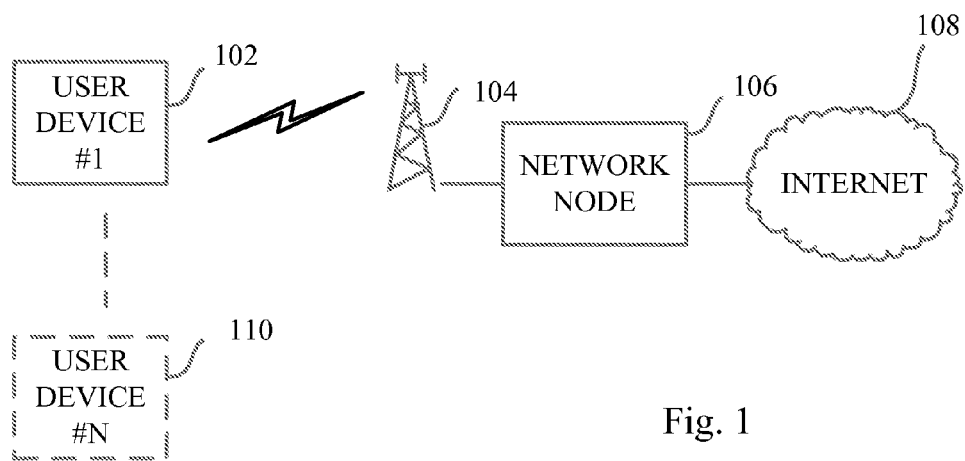
FIG. 1 presents a communication environment related to embodiments of the invention.

FIG. 1 presents a communication environment related to embodiments of the invention. FIG. 1 illustrates a user device 102, a base station 104, a network node 106 and Internet 108. In addition, user device 110 indicates at least a temporary presence of a subset of user devices, according to embodiments of the invention.

Figure 2:
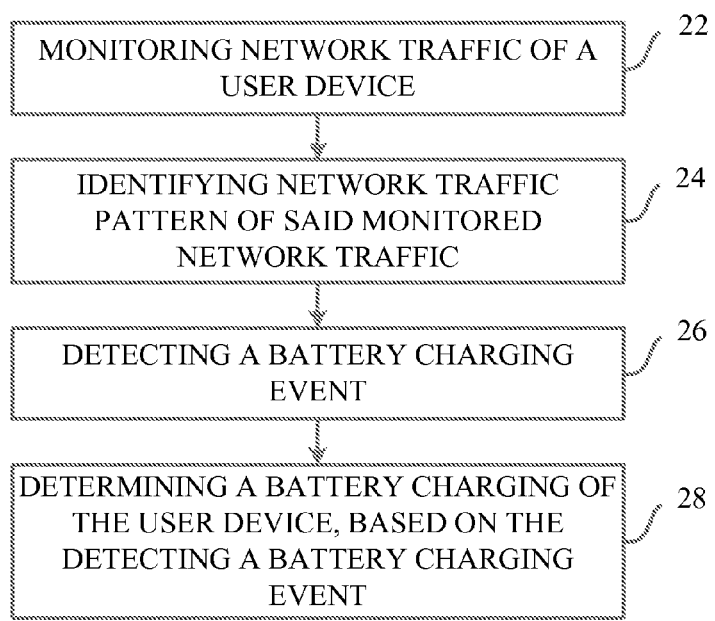
FIGS. 2 and 3 are flowcharts of method steps illustrating embodiments of the invention.

FIG. 2 presents a flowchart of a method for determining a charging of a battery of a user device 102.

In 22, network traffic of the user device is monitored, wherein the network traffic comprises network traffic of an application and/or a service on the user device.

In 24, a network traffic pattern of the monitored network traffic is identified.

In 26, a battery-charging event is detected, based on the identified network traffic pattern.

In 28, a charging of the battery of the user device is determined, based on the detected battery-charging event.

The network traffic of an application and/or a service may comprise network traffic of one or more levels of the user device.

The network traffic of an application and/or a service may comprise network traffic of one or more transfer control protocol/Internet protocol layers.

The traffic as monitored in a network node 106 for a user device 102, such as a smartphone, may relate to a footprint of services or applications running on several levels on the user device.

The one or more levels of traffic of the user device 102 at issue in this context comprise at least one of: an operating system running on the user device, a customization of the operating system for different manufacturers of the user device 102, and a customization of the operating system by a user of the user device 102 itself.

In more detail, a first or "lowest" level of network traffic is associated with or characteristic of the operating system (OS) of the user device 102. Typically, a part of the overall generated data traffic is OS specific. For example, APPLE devices can send and receive data to/from APPLE service servers such as ICLOUD, ITUNES. Similarly, ANDROID devices characteristically exchange data with one or more GOOGLE services, e.g., in conjunction with applications or services using the GOOGLE cloud.

A second level of network traffic is associated with or characteristic of customization of the OS by the different device manufactures. For instance, in the case of the ANDROID operating system, Samsung, HTC, LG, and Sony all have their own extra app stores, own cloud systems for data backup of the devices, own apps (e.g., Timescape for Sony), and own widgets (e.g., HTC main menu).

A third level of network traffic is associated with or characteristic of device users' customization of their user devices 102 with apps and widgets of their own choosing. These apps and widgets can receive push notification for updates from e.g., GOOGLE cloud, or can query for data from various applications, such as ACCUWEATHER or YAHOO Stock Exchange.

Among the various traffic flows or levels discussed above, certain Domain Name System, DNS, queries are the most easily distinguishable. That is, depending on any one or more of the device's operating system, its OS customizations, and its installed apps or services, the network can expect to see certain DNS queries targeting certain DNS servers whenever a given user device experiences certain events, such as being connected to or disconnected from a battery charger. In particular, there may be an easily distinguishable set of DNS queries that are sent before communicating with targeted servers.

Determining the charging 28, 38 of the battery of the user within the method in a network node 106, may comprise determining whether the battery of the user device 102 is on charge or not.

In case of APPLE iOS devices, such as the IPHONE, the below example DNS queries will be seen.

When the phone is put on a charger at 10:20:
2013-05-28  10:20:11.863490  IP 192.168.31.2.55916>212.24.164.1.53:  51122+A?  time-.apple.com. (32)
2013-05-28  10:20:11.897912  IP 192.168.31.2.55046>212.24.164.1.53:  26151+A?  ax.init.itunes.apple.com. (42)
2013-05-28  10:20:12.639367  IP 192.168.31.2.55042>212.24.164.1.53:  63741+A?  mesu.apple.com. (32)
2013-05-28  10:20:13.446414  IP 192.168.31.2.61440>212.24.164.1.53:  62266+A?  su.itunes.apple.com. (37)
2013-05-28  10:20:13.757731  IP 192.168.31.2.65288>212.24.164.1.53:  38455+A?  EVSecure-ocsp.verisign.com. (44)
2013-05-28  10:20:18.019833  IP 192.168.31.2.62342>212.24.164.1.53:  58559+A?  p14 keyvalueservice.icloud.com. (48)

Continuing this example, when the phone is removed from the charger at 10:50, the following DNS queries are seen:
2013-05-28  10:50:14.067546  IP 192.168.31.2.50625>212.24.164.1.53:  35226+A?  globalcache.internal.query.g03.yahoodns.net. (62)
2013-05-28  10:50:14.072050  IP 192.168.31.2.64607>212.24.164.1.53:  52494+A?  globalcache.internal.query.g03.yahoodns.net. (62)

Thus, in an example embodiment, a network node may be configured to monitor network traffic for a user device, and to identify from that monitoring a network traffic pattern, including identifying those messages that are characteristically triggered by a battery-charging event. Identifying the network traffic patterns in this manner enables the node to detect battery-charging events, and to thereby determine the charging of the battery of the user device. For example, as seen in the above case, the messages identified as being triggered by a battery-charging event may comprise DNS messages.

It is also contemplated in one or more embodiments to use deep packet inspection (DPI). Notably, DNS queries can be easily parsed with a DPI method.

Of further note, it is recognized herein that DNS queries not accompanied by corresponding data traffic transmissions are more likely to be associated with charging events. For example, identifying one or more DNS queries in combination with the subsequent absence of any data traffic transmissions, e.g., for some extended time like thirty minutes, increases the probability that the identified DNS queries are due to charging events.

In another aspect of the teachings herein, the charging status of the battery in a given user device 102 is estimated as a function of the detected battery-charging time. In one such example, the network node 106 monitors network traffic and identifies a network traffic pattern for the user device 102 that is characteristic of the device 102 being placed on a charger. Later, the network node 106 identifies a network traffic pattern that is characteristic of the device 102 being taken off the charger, and it estimates the charging state of the device battery as a function of time elapsed between when the network traffic indicated that the device 102 was placed on the charger and when the network traffic indicated that the device 102 was taken off the charger. A user device 102 left on its charger for quite some time, such as for hours, will likely be fully charged.

It is noted that a continuous monitoring of network traffic is often needed in order to clearly determine a battery charging status. An interrupted connection may correspond to heavy battery usage, which can consume a considerable amount of charge from of the device battery in question.

Figure 3:
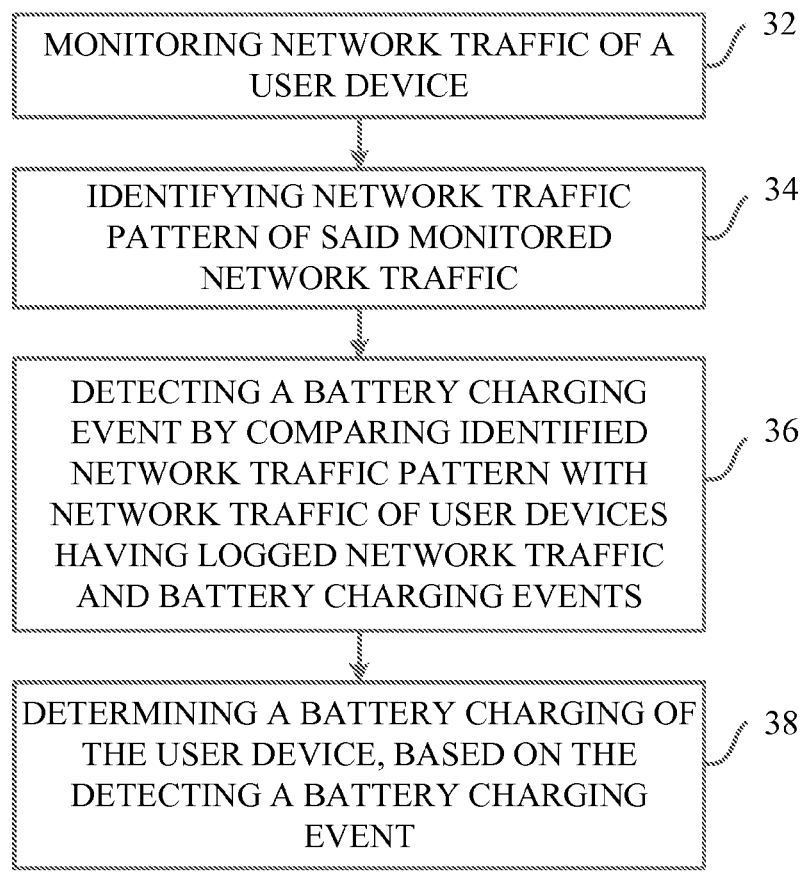

FIG. 3 presents a flowchart of a method for determining a charging of a battery of a user device 102, according to some embodiments of the present invention.

This flowchart is similar to the one as presented in FIG. 2; the difference being how detecting a battery-charging event is executed.

For this reason Steps or Operations 32 and 34 corresponds to 22 and 24, respectively, as described above.

In 36, detecting a battery-charging event is performed by comparing identified network traffic pattern with network traffic of a subset of user devices 110 having logged network traffic and logged battery-charging events.

In 38, battery charging of the user device 102 is determined based on the detecting a battery-charging event.

Using correlations of battery-charging events and monitored network traffic of other user devices, such as a subset of user devices 110, can provide an increased reliability for detecting charging events based on network traffic monitoring.

Within a subset of user devices 110 a battery and charging logger application could be installed. As mentioned above in connection with FIG. 1, the subset of user devices is indicated as 110 in FIG. 1.

The user devices 110 having the installed logger application would hardly be affected by the installed application, since it is adapted to run in the background and to log battery status of each user device 102 on which it is installed. The collected logs are reported and can be stored in a central database. Network traffic of the user devices 110 with said installed application activity logger is also recorded and processed with traffic recognition methods e.g., DPI.

A battery-charging event and the network traffic of the user devices 110 having the installed application are correlated. This can result in charging event-specific models that map network traffic to battery-charging events and store the mapped results for further usage.

Network traffic of an entire population can be processed with traffic recognition techniques. By applying said charging event-specific models on monitored network traffic, charging event detections or estimations can be done for a large number of user devices 102.

The creation of these models may further consider daily routines of the user using said user devices 102. By adding time information into models, improved models may be achieved.

By also considering daily routines, and time in general, the number of charging events in cases involving pluralities of charging events can be correlated to device usage and further to the battery states of user devices.

A number of use cases that rely on charging event and device usage correlation, can be envisaged. For example, if a user is detected as charging his or her user device 102 more frequently than the average, the operator may draw the conclusion that the user uses the device heavily, either implicating heavy data traffic or just using offline but energy consuming applications. These users can be pinpointed and offered a larger data plan or a high-end user device.

Another plausible explanation could be a faulty battery that can result in numerous charging events. These users could also be pinpointed and offered a battery replacement.

If a user's recorded charging events are less frequent than an average, it might be explained by being connected to WiFi at locations where charging is performed, e.g., at home. Such information can further be helpful for the operator to estimate the subscriber's online activity during those periods when the subscriber is connected to WiFi instead of the operator's network.

If it is noted that a user device 102 has not been charged for a relatively long time, a network operator can, in response, put the user device into more energy efficient state. In one such example, the device is forced to a 3G Radio Access Technology (RAT) instead of Long Term Evolution or LTE connectivity. Additionally, or alternatively, the device 102 may be configured to use longer discontinuous reception (DRX) timers.

Figure 4:
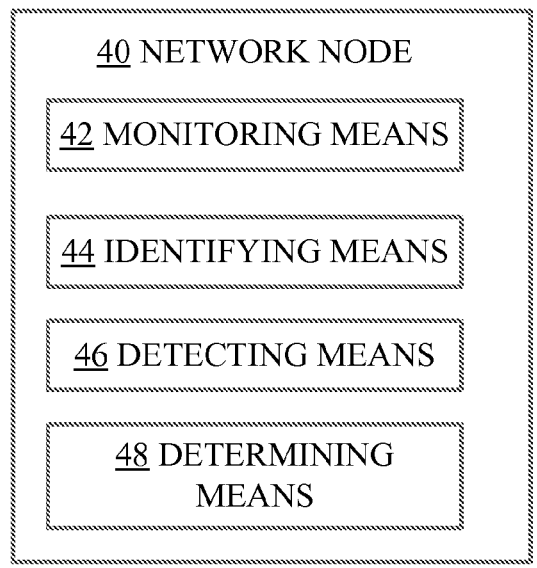
FIG. 4 schematically presents a network node of embodiments of the invention.

FIG. 4 presents a block diagram of a network node 40 for determining a charging of a battery of a user device 102. The network node 40, which may be understood as an example implementation of the previously introduced node 106, comprises circuitry and communication interface(s) for carrying out the processing operations disclosed herein. Such circuitry may be arranged, e.g., as a monitoring means 42 that is adapted to monitor 22, 32 network traffic of the user device 102, wherein the network traffic comprises network traffic of an application and/or a service of the user device. The network node 40, 106 further comprises identifying means 44 that is adapted to identify 24, 34 network traffic pattern of the monitored network traffic. The network node 40, 106 further comprises detecting means 46 that is adapted to detect 26, 36 a battery-charging event based on the identified network traffic pattern. In addition, the network node 40, 106 comprises determining means 48 that is adapted to determine 28, 38 the charging of the battery of the user device 102, based on the detected battery-charging event.

The identifying means 44 of the network node 40, 106 may further be adapted to identify 24, 34 messages triggered by a battery-charging event.

The identifying means 44 of the network node 40, 106 may further be adapted to use deep packet inspection, DPI.

The detecting means 46 of the network node 40, 106 may further be adapted to compare identified network traffic pattern of the user device with network traffic of a subset of user devices 110 having logged their respective network traffic and battery-charging events.

The determining means 48 of the network node 40, 106 may further be adapted to estimate a battery charging status based on the detecting a battery-charging event as a function of time.

The determining means 48 of the network node 40, 106 may further be adapted to determine whether the battery of the user device 102 is on charge or not.

The network node 40, 106 may further comprise a radio network controller or a gateway. In this regard, it will be appreciated that implementation details of the network node 40, 106 will vary in dependence on its overall functionality and features. However, it will be understood that the network node 40, 106 in an example embodiment includes communication interface circuitry used for sending and receiving signaling associated with its traffic-monitoring and corresponding battery-charging determining functions, e.g., for receiving the network traffic at issue herein, or for receiving information indicating such network traffic.

Further, the example network node 40, 106 includes fixed or programmed processing circuitry that is configured to carry out the network-traffic monitoring 22, 32, traffic-pattern identifying 24, 34, battery-charging event detecting 26, 36, and battery-charging determining 28, 38 operations taught herein. Such digital processing circuitry comprises, for example, one or more CPUs and associated supporting interface circuitry. Such circuitry is configured to obtain network traffic information for one or more user devices 102, e.g., via the included communication interface circuitry, and to detect battery-charging events therefrom.

It can be noted that smartphones of today comprise several battery draining components, each of which having its specific power characteristics. These components comprise the CPU, display, mobile data connection, positioning system, WiFi, Bluetooth, near field communication (NFC), etc. Network measurements enable identification of applications used by the user, estimating the CPU and display usage. Power requirement of mobile data connection depends on the connection type, such as 2G/3G/4G, occupied channels, DRX modes, etc., all of which can be rebuilt from packet level measurements.

In simulations of battery charging status, it is an advantage to set a reliable initial state, because the simulation of charging and depleting provides only a battery status change, rather than an exact absolute battery charge value. A reliable initial state can be a fully charged status, e.g., after a smartphone has been plugged into a charger for a number of hours, as noticed above.

It is further advantageous that the user devices 102 that are analyzed with methods as disclosed herein, can be tracked without any connection gaps i.e. there is no such case that the tracked user device disconnects from the mobile network, switches off or changes connection to WiFi.

For this reason, the "air plane mode" of user devices 102, such as mobile phones, wherein user devices 102 are disconnected from the network, can prevent a reliable estimate of the battery charging status of user devices.

Alternatively, in cases of interrupted connections, it has to be ensured that the secondary network is also tracked i.e. the WiFi hotspot or the digital subscriber line (DSL) network. Hints on the user device 102 being connected to WiFi for a while can be obtained from tracking Internet protocol (IP) sequence numbers. For example, in at least one such embodiment, a significant increase of IP sequence numbers between two measurements is taken as an indication of the user device 102 being used on a secondary network.

Embodiments of the present invention provide a number of advantages of which one is the possibility for a network operator to implement detection of battery-charging events in a current network setup, as no changes in the current network deployment or additional protocols are needed.

The detected battery-charging events can be also used by the operators for several use cases e.g., offering battery replacement for a user device.

It may be further noted that the above described embodiments are only given as examples and should not be limiting to the present invention, since other solutions, uses, objectives, and functions are apparent within the scope of the invention as claimed in the accompanying patent claims.

It should also be noted that various technical abbreviations are used herein and/or are applicable to involved technical field, including these items:
CPU—central processing unit
DPI—deep packet inspection
DRX—discontinuous reception
DSL—digital subscriber line
IP—Internet protocol
LTE—long term evolution
NFC—near field communication
OS—operating system Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a network node for determining a charging of a battery of a user device, the method comprising:
monitoring network traffic of the user device, wherein the network traffic comprises network traffic of an application and/or a service of the user device;
identifying a network traffic pattern of the monitored network traffic;
detecting a battery-charging event based on the identified network traffic pattern; and
determining the charging of the battery of the user device, based on the detected battery-charging event;
wherein identifying the network traffic pattern comprises using deep packet inspection, DPI, to identify messages triggered by the battery-charging event.

2. The method according to claim 1, wherein the network traffic of an application and/or a service comprises network traffic of one or more levels of the user device.

3. The method according to claim 2, wherein said one or more levels of the user device comprise at least one of: an operating system running on the user device, a customization of the operating system for different manufacturers of the user device, and a customization of the operating system by a user of the user device.

4. The method according to claim 1, wherein the messages comprise domain name system, DNS, messages.

5. The method according to claim 1, wherein detecting a battery-charging event further comprises comparing the identified network traffic pattern of the user device with network traffic of a subset of user devices having logged their respective network traffic and battery-charging events.

6. The method according to claim 1, wherein determining the charging comprises determining whether the battery of the user device is on charge or not.

7. The method according to claim 1, wherein determining the charging comprises estimating a battery charging status of the battery, based on the detecting a battery-charging event as a function of time.

8. A network node configured to determine a charging of a battery of a user device, the network node configured to:
monitor network traffic of the user device, wherein the network traffic comprises network traffic of an application and/or a service of the user device;

identify network traffic pattern of the monitored network traffic;

detect a battery-charging event based on the identified network traffic pattern; and determine the charging of the battery of the user device, based on the detected battery-charging event;

wherein the network node is configured to identify the network traffic pattern by using deep packet inspection, DPI, to identify messages triggered by the battery-charging event.

9. The network node according to claim 8, wherein the network node is configured to compare the identified network traffic pattern of the user device with network traffic of a subset of user devices having logged their respective network traffic and battery-charging events.

10. The network node according to claim 8, wherein the network node is configured to estimate a battery charging status based on the detecting a battery-charging event as a function of time, or is configured to determine whether the battery of the user device is on charge or not.

11. The network node according to claim 8, wherein the network node comprises a radio network controller or a gateway.

12. A network node configured to determine a charging of a battery of a user device, the network node configured to:

monitor network traffic of the user device, wherein the network traffic comprises network traffic of an application and/or a service of the user device;

identify network traffic pattern of the monitored network traffic;

detect a battery-charging event based on the identified network traffic pattern; and determine the charging of the battery of the user device, based on the detected battery-charging event;

wherein the network node is configured to identify messages triggered by battery-charging events; and wherein the network node is configured to identify the messages triggered by battery-charging events based on being configured to detect Domain Name Service, DNS, queries that are characteristic of the user device being placed on or taken off of a charger.

* * * * *